United States Patent [19]
Brusse et al.

[11] Patent Number: 5,370,147
[45] Date of Patent: Dec. 6, 1994

[54] APPARATUS AND METHOD FOR AN INFLATABLE BLADDER VALVE SYSTEM

[76] Inventors: Jaime R. Brusse, 13827 Tabiona Dr., Silver Spring, Md. 20906; Frank C. Zegler, P.O. Box 880052, San Diego, Calif. 92168

[21] Appl. No.: 168,436

[22] Filed: Dec. 16, 1993

[51] Int. Cl.$^5$ .............. F16K 7/10; F16L 55/128
[52] U.S. Cl. ............... 137/15; 137/682; 137/315; 138/93; 251/61.1
[58] Field of Search .......... 137/15, 68.2, 228, 315, 137/317, 318; 138/93; 251/61.1

[56] References Cited

U.S. PATENT DOCUMENTS

| | | | |
|---|---|---|---|
| 175,035 | 3/1876 | Conaughton | 137/433 |
| 1,906,151 | 4/1933 | Goodman | 138/93 |
| 1,946,138 | 2/1934 | Gardner | 138/93 |
| 3,022,977 | 2/1962 | Jones | 251/61.1 |
| 3,128,078 | 4/1964 | Kosik | 251/214 |
| 3,159,377 | 12/1964 | Samour | 251/335.3 |
| 3,227,369 | 1/1966 | Leemhuis | 251/61.1 |
| 3,567,176 | 3/1971 | Johnson | 251/335.3 |
| 3,805,844 | 4/1974 | Bacon | 138/93 |
| 3,881,519 | 5/1975 | Zahid | 251/335.3 |
| 3,990,464 | 11/1976 | Jenkins | 138/93 |
| 4,023,772 | 5/1977 | Ratelband | 251/61.1 |
| 4,119,120 | 10/1978 | Mehaffy et al. | 251/61.1 |
| 4,155,373 | 5/1979 | DiGiovanni | 138/93 |
| 4,205,697 | 6/1980 | Gebelius | 137/68.2 |
| 4,351,349 | 9/1982 | Minotti | 138/93 |
| 4,399,738 | 8/1983 | Sharkey | 251/61.1 |
| 4,417,598 | 11/1983 | DePirro | 138/93 |
| 4,565,222 | 1/1986 | Lundman | 137/318 |
| 4,633,910 | 1/1987 | Sugimuru | 251/61.1 |
| 4,672,988 | 6/1987 | Tash | 251/61.1 |
| 4,840,191 | 6/1989 | Gausman et al. | 138/93 |

Primary Examiner—George L. Walton

[57] ABSTRACT

An inflatable bladder valve including an inflatable bladder for sealing large diameter piping ducts. The sealing element is an inflatable membrane, surrounded by a high strength fabric restraint. Prior to deployment, the inflatable bladder is in a folded deflated state, and stowed in a stowing receptacle external to the piping duct. An aperture in the piping duct wall leads to the stowage receptacle. This aperture is blocked by a plug. One end of a gas pressure actuator is received through the base of the stowage receptacle where the inflatable bladder is stowed. When the actuator is actuated, the release of the gas pushes the plug out of the aperture causing the inflatable bladder to immediately inflate and seal the piping duct. The inflatable bladder is self-aligning by virtue of a spherical duct housing which serves to restrain movement of the inflatable bladder caused by upstream pressure. An inflatable torus seal, around the perimeter of the fabric restraint allows for dimensional variations in the piping duct.

24 Claims, 2 Drawing Sheets

APPARATUS AND METHOD FOR AN INFLATABLE BLADDER VALVE SYSTEM

BACKGROUND OF THE INVENTION

1. Field of the Invention

This invention relates to valves in piping, and more particularly, but not by way of limitation, to a valve which inflates into a fluid stream immediately stopping the fluid flow.

2. Description of the Related Technology

It is well known that valves of a large number of varieties and designs have been used for many years for a variety of purposes. Bladders used in some of the valves have been made of rubber and other materials to hold different liquids, depending on the application, cost, and weight considerations. Also well known in the art are expandable seals. These seals are flexible enough to be pressed against another structure for sealing, yet durable enough to withstand many expansions and contractions, again depending on application. The materials used in these seals differ depending on factors such as the type of gas, or liquid, coming in contact with the seals. Sometimes the fluids contacting the seals are corrosive or radioactive. Another factor influencing the selection of seal or bladder material for a particular valve application is the shelf life of that material when not in use.

One field of use involving a variety of valve types is in the aerospace field. For example, design requirements dictate using a shutoff valve for applications in rocket staging systems. Rocket staging systems can provide a variety of propulsion fluids for lifting payloads into space. Depending on the staging system design, one or more stages provide propulsion fluid, such as hydrogen or other rocket fuel, to rocket motors. Timing is critical to achieving liftoff of a launch vehicle, achieving orbit, and making minor corrections in trajectory. Therefore, any valve intended to shut off fluid flow to the engines must operate immediately and effectively. Otherwise, the fluid fuel provides unwanted additional propulsion. In addition to a need for a valve to effectively control fluid flow, it is critically important for valves to shut down under emergency situations. If a valve does not immediately close, lives may be lost because of explosions or inadvertent lift off.

Conventional aerospace shutoff valves have been used for years. These valves are typically of the ball or butterfly type. Two typical activating mechanisms used in aerospace shutoff valves for large diameter piping ducts are electromechanical or pneumatic. In an electromechanical system, the shutoff valve is typically motor driven. More typically, a pneumatic actuating mechanism would use a piston to cause a rack and pinion gear train to close the shutoff valve.

Problems with the above-described shutoff valves include undesirable weight penalties, because of the required metallic materials used. The shutoff valves are also complex in design. Added weight and design complexity result in increased system costs. Design complexity may also require additional backup systems because of single point failure concerns with particular components. Ideally, a design should be fail safe when safety is a prime consideration.

Other operating environments also require shutoff valves to prevent or stop catastrophes to people or equipment. For example, ocean recovery systems, explosive fluid and toxic fluid systems require immediate fail-safe shutoff valves.

With today's increased emphasis on safety, improved fail-safe devices are required. Additionally, the added costs of components, labor, and component replacement, and the unavailability of launch vehicles due to system failure have added significantly to launch system costs and loss of market share in commercial operations.

Therefore, over time, many attempts have been made to improve shutoff valves. Some of the attempts to address particular requirements and environments are explained in the following representative and pertinent prior art.

JONES U.S. Pat. No. 3,022,977, discloses a vacuum operated normally closed valve where an inflated bulb collapses. The valve of the reference is designed to prevent solid particles from flowing. The JONES valve is not normally open, nor is the JONES valve used to stop fluid flow.

KOSIK U.S. Pat. No. 3,128,078, discloses a gate valve with an expandable seal acting against an air cushion. A gate valve allows closing and opening of a space to either prevent or allow passage of a substance. KOSIK's valve is operated by a handwheel which may be turned in a clockwise direction to close the valve. Numerous metallic parts are used in this invention. The valve of the reference operates mechanically and is manually operated. One of the problems with the KOSIK valve is that it has numerous parts requiring manufacture, thereby creating additional weight, and therefore incurring additional costs. In addition to the problem of additional weight, the KOSIK valve is not suitable for handling situations where immediate flow stoppage is mandatory. The valve is also not convenient for use in large diameter piping or ducting because of the added force required for closing or opening. The complex design of the KOSIK valve suggests a relatively expensive system.

SAMOUR U.S. Pat. No. 3,159,377, discloses an inflatable bladder. One of its objects is to provide a stopper valve for piping used in the chemical industry. The SAMOUR valve needs to ensure perfect tightness and resistance to corrosive products at high temperatures. The bladder is closed by inflating it with a fluid. One of the problems with the SAMOUR valve includes being of a highly complex design because of the particularly stringent design requirements for handling chemically corrosive fluids. Therefore, the cost of manufacture is relatively high. The valve of SAMOUR also has an axially placed valve within the piping. Having a valve transversely in line with the fluid is a problem because the components are exposed to corrosive materials and, therefore, must be impervious to corrosion. In addition, an unacceptably high pressure drop occurs across the valve area because the valve is partially obstructing the flow of fluid.

JOHNSON U.S. Pat. No. 3,567,176, is of interest because it discusses a ball valve assembly wherein the ball member moves transversely within a pipe to close off the downstream end from the upstream end. The JOHNSON valve does not remain in one location within a pipe or duct. The valve ball is pre-loaded between annular seals. The valve is also pressed tightly against structure by internal fluid pressure. A secondary stem seal is provided as a backup mechanism should the axially corrugated tubular envelope which covers the valve stem fail. The JOHNSON valve is used in piping that must be permanently sealed, and carry corrosive, radioactive, or other dangerous and harmful fluids. One of the problems associated with the JOHNSON valve includes the complex nature of the design to meet the need to handle radioactive fluids. The components must have a very long life, and the sealing features must be fail safe. Therefore, costs for this valve system are relatively high.

MEHAFFEY et al U.S. Pat. No. 4,119,120, shows a fluid switch having an elastomeric membrane, portions of which may be subjected to fluid pressure to deform or be "inflated" into valve closing positions. MEHAFFEY et al. discloses a system which repeatedly acts against a diaphragm, with fluid as the switching mechanism. Depending on the need, the switching action stops one liquid while allowing another to pass through the piping system. MEHAFFEY et al. does not provide a single action non-repeatable stopper valve. Also, the MEHAFFEY et al. valve does not use a gas as the means for providing pressure to stop fluid flow. Other prior art devices exist in the field of stopper or shutoff valves, yet are merely representative of the general field of valves.

Therefore, it is clear that the prior art devices do not fill the continuing need for an inflatable bladder valve which provides a simple design for quick installation and ease of replacement, yet is inexpensive to manufacture. In addition, a need exists for a valve providing immediate and effective closure in a single action to stop fluid flow in large diameter piping ducts.

SUMMARY OF THE INVENTION

The above-mentioned disadvantages and problems of the prior art devices are overcome by the present invention. Briefly stated, the preferred embodiment of the present invention provides an inflatable bladder valve system for immediately sealing or shutting off large diameter ducts which carry fluids. The feature of immediate closure action is extremely important in fluid systems in order to regulate propulsion burn in aerospace applications. In addition to regulating propulsion burn, it is critically important to be able to immediately and definitively shut down a system in an emergency. A valve which immediately closes provides a safe operating system and environment.

The inflatable bladder valve system includes a fluid conduit, such as a piping duct, through which flows a fluid in contact with an inner surface of the conduit. The bladder valve system also includes an inflatable bladder stowed initially in a deflated state outside the fluid flow path of the conduit. Surrounding an outer surface of the inflatable bladder is a fabric restraint which helps shape the bladder when inflated. A barrier, such as a plug, is positioned between the inflatable bladder and the fluid flow path to prevent any portion of the deflated bladder from extending into the fluid flow path until the bladder is inflated. The plug is secured to one end of the inflatable bladder and therefore forms a portion of the bladder. Specifically, the plug is secured adjacent to an aperture in a wall of the conduit. A source of fluid, such as a gas, is in communication with the deflated bladder to transmit the gas into the deflated bladder to inflate it.

Upon inflation, as produced by an inflation actuating mechanism, the bladder expands within a portion of the fluid conduit to form a seal between the fabric restraint and the inner surface of the conduit, thereby preventing substantial fluid flow through the conduit. The portion of the conduit which retains the bladder is preferably an enlarged spherical chamber.

More specifically, the bladder includes an inflatable membrane, surrounded by the high strength fabric restraint, manufactured from a material such as Kevlar TM. Preferably, the fabric restraint is filament wound. Prior to deployment, the bladder is in a deflated and neatly folded condition, and stored at a point external to the piping duct, such as in a stowage receptacle in a wall of the piping duct. An extremely low fluid pressure drop exists across the bladder area, because no hardware is located within the fluid flow path in the piping duct. Initially, all movable components of the present invention are external to the axial flow of fluid within the piping duct. Upon inflating, the bladder enters the duct through a port in the duct wall and passes transversely, or perpendicularly, to the duct to immediately seal the duct, thereby preventing fluid flow.

The port is preferably sealed by a plug with a radial static O-ring. Preferably, the plug is of the same material as the piping duct. The bladder is inflated by using a low pressure (LP) gas actuator. Preferably, a $CO_2$ cartridge is used as the gas source. However, a stored gas cylinder or a pyrotechnic gas generator may also be used, depending on the specific application. On command from a remote location, the $CO_2$ cartridge is activated thereby pushing the plug out of the port, and allowing the bladder to inflate into the duct.

Being remotely controllable means safer operation of the present system compared to some previous shutoff valve designs. It is particularly important to provide for remote control when local access is not possible, or when toxic fluids or explosive fuels are used in the piping duct. The bladder is self-aligning by virtue of the spherical chamber, which is preferably a metallic spherical duct housing integral to the piping duct. The spherical duct housing has a diameter exceeding that of the piping duct. The dimensions of the diameter are dependent upon the specific application. The shape of the spherical duct housing matches the shape of the bladder, and therefore provides the self-alignment feature. The duct housing prevents axial or twisting movement of the bladder which may be caused by upstream fluid pressure.

An inflatable torus seal, preferably made of a thin flexible elastomeric material, surrounds a portion of a perimeter of the fabric restraint. The torus seal ensures that a seal is maintained, and allows for dimensional variations. The torus seal, therefore, provides the mechanism to sufficiently and definitively seal a fluid passageway. Such high reliability of operation is necessary, as previously described, particularly for critical systems such as those found in space vehicles.

Another embodiment of the inflatable bladder valve system uses a different apparatus to inflate the bladder. An electrical connection provides electrical power to a gas producing squib to start the inflating process. As the inflatable bladder inflates, it pushes a rupture diaphragm, installed in a perimeter of the spherical duct housing, into the piping duct. This rupture diaphragm takes the place of the plug in the first embodiment to restrain the deflated bladder within the stowage receptacle.

Regardless of whether the first or the second embodiment is used in a system, both are readily replaceable. Quick installation is an important advantage because as the time involved in replacement is reduced, the cost of replacement is, of course, also reduced.

A method of using the inflatable bladder valve system involves providing an inflation actuating mechanism with a stored bladder in a receptacle external to the piping duct. Preferably, a spherical duct housing is integrally manufactured into the piping duct to receive the inflatable bladder. However, other housing shapes, such as oblong or conical, may be more desirable, depending on the envisioned end use of the inflatable bladder valve system. Remotely actuating the low pressure gas actuator in the actuating mechanism causes the deflated bladder in the stowage receptacle to inflate. The inflating process is such that there is a pressure tight sealing relationship between the fabric restraint of the bladder and the spherical duct housing. The inflating is in a generally perpendicular direction to fluid flow in the duct. After the bladder has inflated and the fluid flow has been stopped, deflation of the bladder occurs over time by osmosis of the gas through the inflatable bladder. Replacing the inflatable bladder and the actuating mechanism with a deflated bladder and another actuating mechanism completes the method of use for the inflatable bladder valve system.

The present remotely controllable invention immediately and effectively closes large diameter piping ducts in a single action, thereby preventing fluid flow, to ensure a safe system and environment. The simple system design equates to low production and maintenance costs compared to prior art devices. In addition to a simple design, the low number of required parts results in lower valve system weight and lower costs compared to prior art systems. The present invention has no ball, popper, or butterfly valves or other mechanical sealing elements of prior art devices. Additionally, the quick installation and ease of replacement of the inflatable bladder valve system is an improvement over prior art devices.

These and other objects and features of the present invention will become more fully apparent from the following description and appended claims taken in conjunction with the accompanying drawings.

DETAILED DESCRIPTION OF PREFERRED EMBODIMENT

Figure 1:
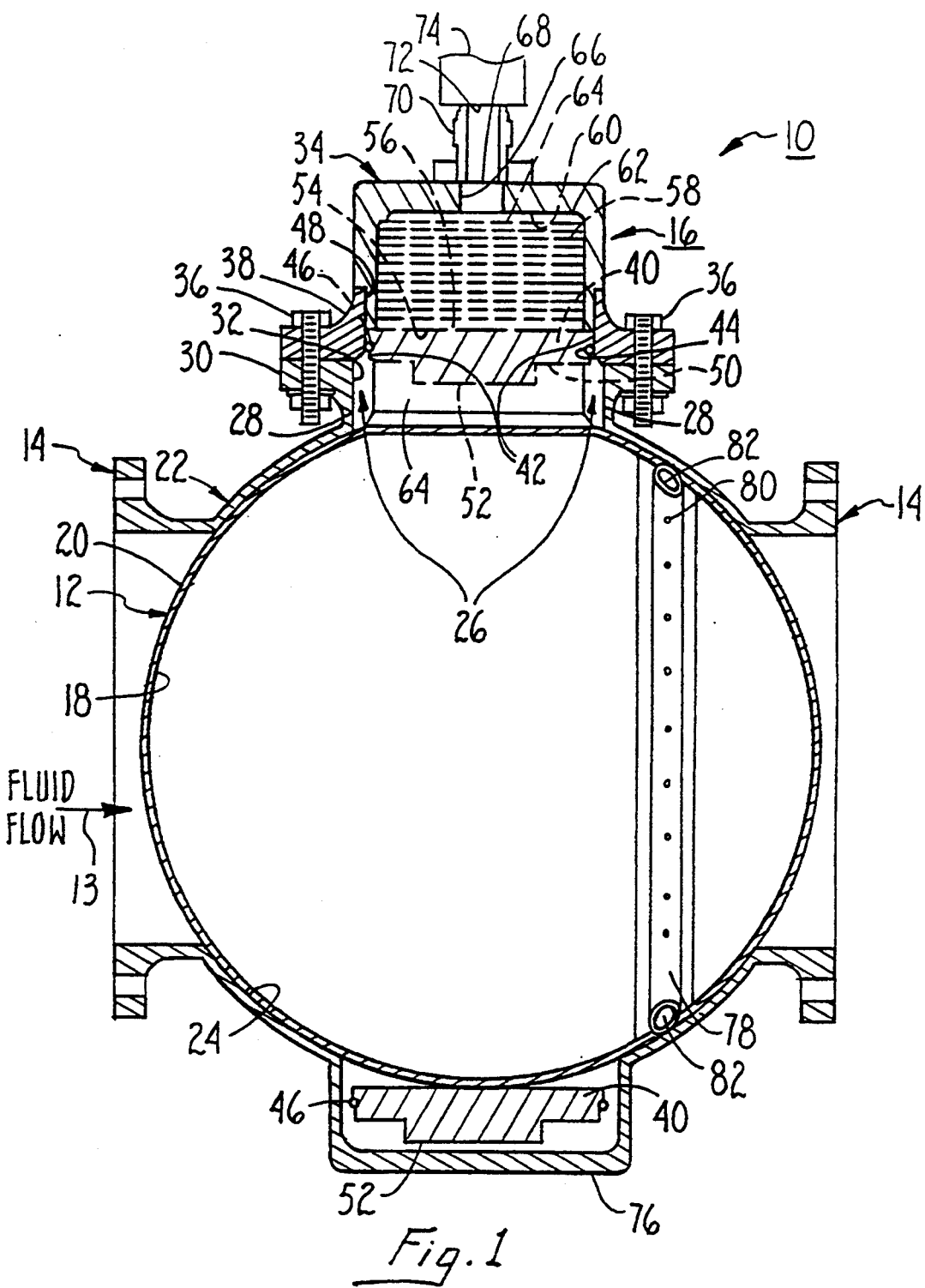
FIG. 1 is a front schematic partial cross-sectional view of a preferred embodiment of the inflatable bladder valve within a representative large diameter ducting.

Referring initially to FIG. 1, there is seen a partial cross-sectional front view of one preferred embodiment of the inflatable bladder valve system 10. A bladder 12 is shown in the inflated position, within a representative large diameter piping duct 14 preferably made of a steel alloy. Inflation of the bladder 12 is in a direction essentially perpendicular to the fluid flow within the piping duct 14. Fluid flow in the piping duct 14 is shown flowing in the direction of arrow 13, that is from left to right, until the fluid is stopped by the inflated inflatable bladder 12. When the bladder 12 is inflated, an inflation actuating mechanism 16 provides the source of air.

Shown in FIG. 1, an inflatable membrane 18, within the inflatable bladder 12, is completely enveloped by a high strength fabric restraint 20. The inflatable membrane 18 is preferably manufactured from a rubber-like material, such as polyurethane, to provide the flexibility required for folding, storing, and inflating the membrane 18. One manufacturer of the inflatable membrane 18 is ILC Dover of Frederica, Del. Other materials are used in environments experiencing temperatures in ranges exceeding room temperature ranges.

Continuing with FIG. 1, a spherical duct housing 22, integrally manufactured into the piping duct 14, has a diameter exceeding that of the piping duct 14, and is dependent upon a specific application. The duct housing 22 is preferably coated with Teflon TM material as is the fabric restraint 20 previously described. Teflon TM provides a minimal coefficient of friction between the fabric restraint 20 and the duct housing 22. Reduced friction ensures that the bladder 12 inflates quickly and smoothly against an inner duct wall 24 of the spherical duct housing 22 without sticking at any spot. The inflatable bladder 12 is self-aligning because of the spherical duct housing 22 which matches the shape of the bladder 12. The duct housing 22 prevents the inflatable bladder 12 from axial movement downstream due to fluid pressure, and also prevents twisting and distortion of the bladder 12 due to current dynamics within the fluid.

In FIG. 1, the fabric restraint 20 is preferably filament wound from a material such as Kevlar TM to provide strength and flexibility. However, a seamless woven construction is another possible embodiment. A dip coating also would be applied to a restraint 20 of woven construction. The rationale for a high strength material for the restraint 20 is the operating pressure range envisioned for the bladder valve system 10. Preferably, the range is 30–100 psig. An outside surface of the fabric restraint 20 is also preferably coated with Teflon TM so that a minimal coefficient of friction exists between the restraint 20 and the duct housing 22.

The inflation actuating mechanism 16, as shown in FIG. 1, includes an aperture 26 in a portion of the piping duct 14, located between substantially vertical walls 28 of a first flange 30. The preferably steel alloy first flange 30 surrounds a substantially circular periphery 32 of the aperture 26. Adjoining the first flange 30 is a stowage receptacle 34 having an inverted cup shape for stowing the inflatable bladder 12 in a deflated state. The stowage receptacle 34 is surrounded at its lower periphery by a second flange 38 which is configured to mate to the first flange 30. Flanges 30 and 38 are secured in mated position by fastening means such as a nut and bolt fastener 36 which extend through aligned holes in the flanges 30 and 38. Other fastening means may be used, such as a plastic self locking securing strap, as known to those skilled in the art.

Continuing with FIG. 1, the actuating mechanism 76 includes a plug 40, preferably of steel alloy, abutting the second flange 38 (shown in phantom in FIG. 1). A circumference 42 of the plug 40 extends completely across and blocks the aperture 26, while a groove 44 within the circumference 42 of the plug 40 holds a radial static O-ring 46, preferably rubber, which removably secures the plug 40 against inner walls 48 (or circumference) of the second mating flange 38. The plug 40 has a bottom 50 with a raised cylindrical central portion 52 which extends into the aperture 26. The plug 40 also has a top 54 which is appropriately affixed to a first end 56 of a deflated bladder 58 (shown in phantom in FIG. 1). With the plug 40 in position as described above, the top 54 of the plug 40 acts to restrain the deflated bladder 58 within the stowage receptacle 34.

More specifically, the deflated bladder 58 of FIG. 1 fills the entire cup-shaped stowage receptacle 34 in a folded state, with a second end 60 of the deflated bladder 58 contacting an inner flat base 62 of the stowage receptacle 34. A flexible fitting 64, having a generally cylindrical-shape, is affixed to the second end 60 of the deflated bladder 58. This flexible fitting 64 is configured to align with a relatively narrow channel 66, preferably of cylindrical shape, through the base 62 of the stowage receptacle 34.

Also shown in FIG. 1 is a low pressure (LP) gas actuator 70 which is another component of the actuating mechanism 16. A bottom end 68 of the gas actuator 70 is received through the narrow cylindrical channel 66 of the base 62 of the stowage receptacle 34. An actuating command device (not shown), such as an electrical source, is connected to a top end 72 of the gas actuator 70 through a connector 74. The configuration and operation of the gas actuator 70 is dependent upon the specific application. However, $CO_2$ is generally preferred as the gas because it is safe, inexpensive, and adaptable to a small container for providing a large volume of gas. Quantities of $CO_2$ cartridges may be purchased from any number of manufacturers. The inflation pressure required from the $CO_2$ cartridges to properly inflate the deflated bladder 58 is about twice (2×) the fluid pressure of a given fluid in the piping duct 14. The preferred inflation pressure was determined from testing of a prototype of the inflatable bladder valve system 10.

continuing with FIG. 1, the gas actuator 70 produces a force of gas to inflate the deflated bladder 58, when actuated by the actuating command device, and pushes the plug 40 outwardly into the spherical duct housing 22 in the piping duct 14. Preferably, the gas actuator 70 uses a $CO_2$ cartridge for the air source. However, other types of LP gas actuators may be used depending on the specific application. Two of these other types include a stored gas cylinder or a pyrotechnic gas generator. Specifically, when the gas actuator 70 is actuated by the actuating command device, the released $CO_2$ gas explodes out of the bottom end 68 of the gas actuator 70 to virtually instantaneously inflate the deflated bladder 58. When the deflated bladder 58 inflates, sufficient pressure is exerted by the first end of the deflated bladder 58 upon the plug 40 and the static O-ring 46 to overcome the opposing force of friction between the O-ring 46 and the inner walls 48 of the second flange 38 to push the plug 40 out of the stowage receptacle 34. The plug 40 is of sufficient weight to ensure that the inflatable bladder 12 moves out of the stowage receptacle 34 in a direction directly perpendicular to the fluid flow in the piping duct 14.

As the inflatable bladder 12 inflates into the spherical duct housing 22, the inflatable membrane 18 expands rapidly against the inner duct wall 24 of the spherical housing 22 to continue forcing the plug 40 against the fluid in the piping duct 14 and across the piping duct into a receiving receptacle 76 opposite to the stowage receptacle 34. The combination of the forces of the $CO_2$, the plug 40 and the expanding inflatable membrane 18 acting against the fluid flowing through the piping duct 14 prevent the inflatable bladder 12 from lodging against the periphery 32 of the aperture 26 in the piping duct 14 and from twisting or turning in the fluid. In addition, the Teflon ™ coating previously described above, helps to ensure smooth expansion of the inflatable bladder 12 against the duct wall 24 in the spherical duct housing 22.

As the inflatable bladder 12 expands, the bottom 50 of the plug 40 easily moves into the receiving receptacle 76. Also, no hindering structure exists within the receiving receptacle 76 for the plug 40 to bind against. Hence, the inflatable bladder valve system 10 effectively and completely stops fluid flow. The plug 40 and the radial static O-ring 46 are shown in the receiving receptacle 76 at the bottom of FIG. 1 in their position after inflation of the inflatable bladder 12.

Also shown in FIG. 1 is a torus seal 78 which is heat sealed around a portion of the fabric restraint 20. The purpose of the torus seal 78 is to provide an additional sealing surface against the spherical duct housing 22. Preferably, the torus seal 78 is an expandable thin membrane of an elastomeric material which is sealed to the fabric restraint 20 before the deflated bladder 58 is stored in the stowage receptacle 34. The torus seal 78, the fabric restraint 20 (which surrounds the inflatable membrane 18), and the inflatable membrane 18 are all attached together when folded in the stowage receptacle. After the inflatable bladder 12 is inflated, the torus seal 78 is inflated by gas from the inflatable membrane 18 bleeding through numerous relatively small bleed holes 80 in the membrane 18, thereby inflating a cavity 82 in the torus seal 78. Silicon material may also be used for the torus seal 78 if used in room temperature applications. The inflated dimensions of the torus seal 78 are variable to allow it to sealably compress against spherical duct housings 22 of different diameters in piping ducts 14.

Although the stowage receptacle 34 described above in FIG. 1 uses the nut and bolt fastener 36 to attach the stowage receptacle 34 to the piping duct 14, other embodiments will be suggested to those skilled in the art. For example, the stowage receptacle 34 may be screwed onto the piping duct 14. Or, an entire section of piping duct 14, including an integrally formed stowage receptacle 34, may be welded into existing piping sections in a modular fashion.

The hereinabove described embodiment of the inflatable bladder valve system 10 is the result of several design iterations. After initial design, a testing procedure was written and implemented to verify overall design concept, and to determine critical dimension ranges and pressure envelopes. Possible diameters of the inflatable bladder 12 and various diameters of the piping duct 14 were examined. Gas pressures were varied to test the strength of numerous materials and designs for the inflatable bladder 12. In addition, different fluid pressures were used in the piping duct 14 to verify that the inflatable bladder valve system 10 would effectively stop fluid flow. As a result of the extensive testing of several prototypes of the inflatable bladder 12, the key ratios for workable designs were determined to be $D_b/D_p$ and $P_b/P_p$, where $D_b$ = diameter of the bladder 12
$D_p$ = diameter of the piping duct 14
$P_b$ = gas pressure in the bladder 12
$P_p$ = fluid pressure in the piping duct 14

Preferably $D_b/D_p > 1.33$ and $P_b/P_p > 2.0$ based on test results. Also verified during the test procedure was that the piping duct 14 is preferably at least six (6) inches in diameter. Generally speaking, six (6) inches is considered a large diameter for a piping duct 14. Although no specific upper limit to the duct 14 is preferred, a practical upper limit does exist based on design considerations, such as weight and cost. Nonetheless, piping ducts 14 of at least several feet in diameter are certainly candidates for the present invention. The duct 14 may carry fluids, such as water, oil, or fuel that might be used in rocket staging shutoff valves, pre-valves, or ocean recovery valves. The resilient and smooth contact of the bladder 12 against the piping duct 14 means that the bladder 12 has no rotational movement. Lack of rotational movement means no damage is done to the bladder 12 because of friction. FIG. 1 illustrates that no internal sealing elements exist, such as those found in prior art shutoff valve devices which use conventional mechanical sealing elements. In the present invention, no poppets, balls, butterflies, or high finish surfaces are used.

Figure 2:
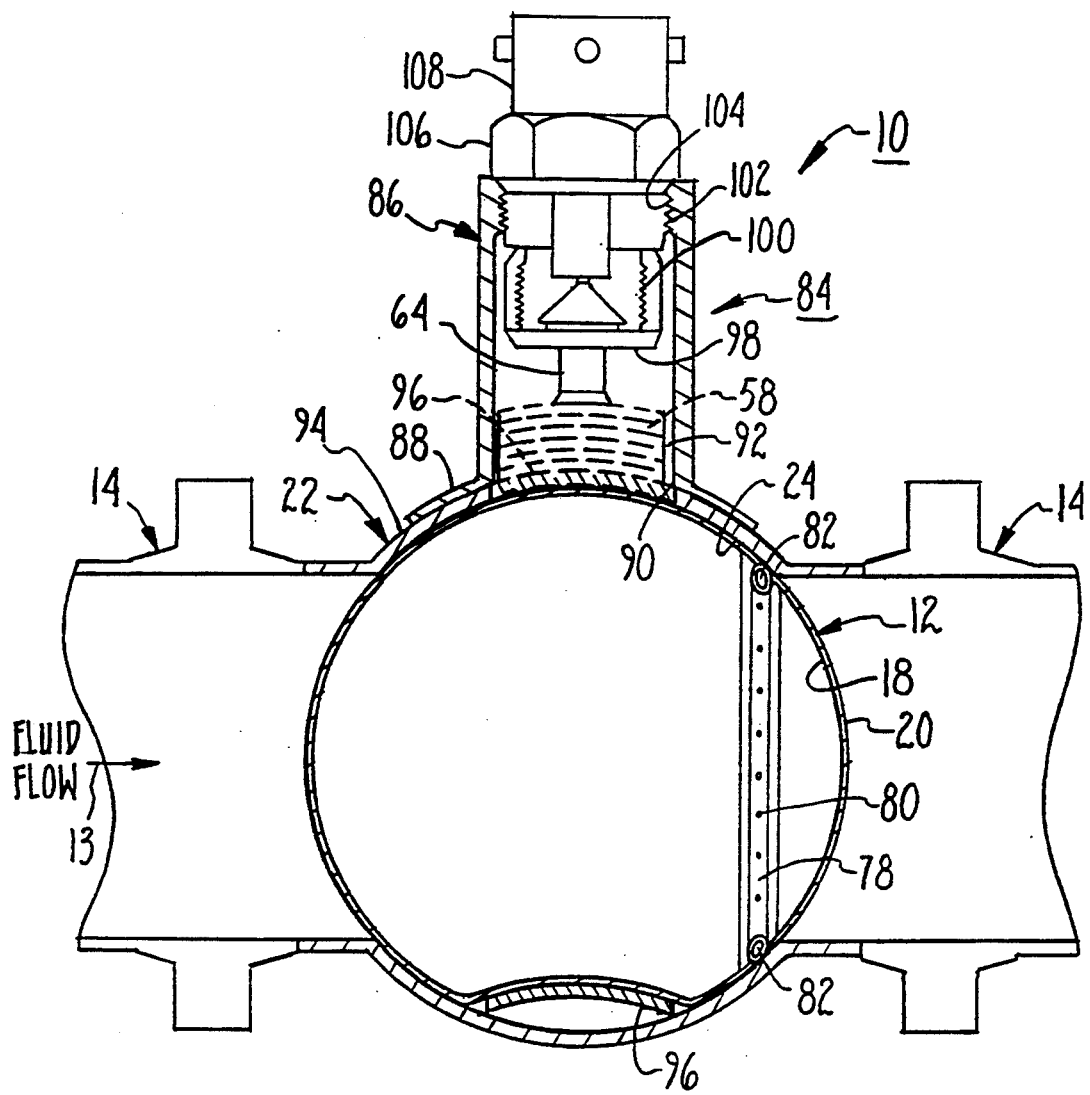
FIG. 2 is a front schematic partial cross-sectional view showing a cutaway portion of a second embodiment of the inflatable bladder valve using a gas producing squib as a gas actuator.

Referring next to FIG. 2, there is illustrated a partial cross-sectional front view showing a cutaway portion of a second embodiment of the bladder valve system 10. In FIG. 2, as previously described in FIG. 1, fluid flow in the piping duct 14 is shown by arrow 13 flowing left to right until the fluid is stopped by the inflated inflatable bladder 12. The second embodiment of the inflatable bladder valve system 10 uses an inflation actuating mechanism 84 as another embodiment with some components which differ from those hereinabove described for the embodiment of the inflation actuating mechanism 16 in FIG. 1.

Specifically, as shown in FIG. 2, a storage receptacle 86 is affixed to the spherical duct housing 22 without fasteners 36 as used in the first described embodiment. Although similar in function to the stowage receptacle 34 in the first embodiment of the bladder valve system 10, the storage receptacle 86 is another embodiment of the stowage receptacle 34 with a curved cap 88, open at a first end 90 of the storage receptacle 86. The curved cap 88 extends outwardly from and covers an opening 92 in the storage receptacle 86. Preferably, the curved cap 88 is welded to an outer wall 94 of the spherical duct housing 22. Differing from the first embodiment where the aperture 26 was in a portion of the piping duct 14, the opening 92 in the second embodiment is in the first end 90 of the storage receptacle 86. Also in contrast to the first embodiment, the opening 92 is blocked by a rupture diaphragm 96 affixed to the first end 56 of the deflated bladder 58.

The rupture diaphragm 96 in FIG. 2 is an alternative embodiment to the plug 40 hereinbefore described in FIG. 1. The rupture diaphragm 96 is preferably essentially contiguous with the inner duct wall 24 and the outer wall 94 of the spherical duct housing 22, yet also secured to the spherical duct housing 22. With the rupture diaphragm 96 in position as described above, the deflated bladder 58 is restrained within the storage receptacle 86 to prevent the deflated bladder 58 from falling into the piping duct 14. A variety of materials may be used in fabricating the rupture diaphragm 96. However, the choice of material must be such that the material properties provide enough strength to resist the internal fluid pressure of the fluid flowing in the piping duct 14. Simultaneously, the material must be weak enough to rupture when the inflatable bladder 12 is inflated causing the bladder 12 to inflate into the piping duct 14. When the deflated bladder 58 is forced into the piping duct 14, the rupture diaphragm 96 is also forced off of the spherical duct housing 22. Yet the diaphragm 96 remains affixed to the inflatable bladder 12 as it is inflating. Note that the rupture diaphragm 96 is shown in the lower portion of FIG. 2 in a position just prior to complete inflation of the inflatable bladder 12.

Contrasting with the first embodiment, the deflated bladder 58 in FIG. 2 does not fill the entire storage receptacle 86. The flexible fitting 64, which is affixed to the second end 60 of the deflated bladder 58, is also affixed to a bottom end 98 of a gas producing squib 100 instead of a $CO_2$ cylinder. In particular, the gas producing squib 100 is illustrated in place of the gas actuator 70 of the first embodiment. The gas squib 100 is a small explosive device, similar to a detonator, however, loaded with low explosives which provide heat to ignite a pyrotechnic. A variety of manufacturers and electrical device vendors, such as those supplying the aerospace industry, provide gas squibs 100 which may be suitable for the present application. A top end 102 of the gas producing squib 100 is threaded to match a threaded inner wall 104 of the storage receptacle 86. Atop the storage receptacle 86 is a nut 106 joining the gas producing squib 100 to an electrical connector 108 which provides the ignition source for the gas squib 100.

The method of operation of the inflatable bladder valve 12, of either FIG. 1 or FIG. 2, allows for location of the stowed deflated bladder 58 in various configurations. The deflated bladder 58 may be located below the horizontal plane of the piping duct 14. Then upon inflating, the inflatable bladder 12 will open upwardly, rather than downwardly, into the duct 14. In addition, the piping duct 14 can be oriented vertically, rather than horizontally as shown in both FIGS. 1 and 2.

The operation of the inflatable bladder valve system 10 is exactly the same in any orientation of the piping duct 14. In particular, the first step in the method of using an inflatable bladder valve system 10 comprises providing a piping duct 14 of suitable diameter. The second step is providing an inflatable bladder 12 with a fabric restraint 20. The third step is storing a deflated bladder 58 in a stowage receptacle 34 outside the piping duct 14. The next step is actuating a low pressure gas actuator 70. The next step is inflating the deflated bladder 34 with the gas actuator 70. The inflating process is such that there is a pressure tight sealing relationship between the fabric restraint 20 of the bladder 12 and the spherical duct housing 22. The inflating is in a generally perpendicular direction to fluid flow in the duct 14. The next step is deflating the bladder 12 through osmosis of the gas through gas permeable portions of the inflatable bladder 12 over time. The final step is replacing the inflatable bladder 12 and the used gas actuator 70 with a deflated bladder 58 and another gas actuator 70.

It can be seen that the present invention provides a simple, easy to use, inexpensive apparatus and method for an inflatable bladder valve system 10.

The foregoing description of the invention is explanatory thereof, and various changes in the size, shape, and materials as well as the details of illustrated construction can be made, within the scope of the appended claims, without departing from the spirit of the invention.

What is claimed is:

1. An inflatable bladder valve system, comprising:
   a fluid conduit having an inner surface providing for fluid flow therethrough;
   an inflatable bladder stowed in a deflated state in a separate compartment of said valve system outside a fluid flow path of said fluid conduit;
   a barrier disposed below and affixed to a portion of said inflatable bladder for retaining said deflated bladder in said separate compartment, said barrier positioned between said inflatable bladder and said fluid flow path for preventing any portion of said deflated bladder from extending into said fluid flow path; and a fluid source in fluid communication with said bladder for transmitting fluid into said bladder so as to inflate said bladder, wherein upon inflation said bladder expands within a portion of said fluid conduit, and said barrier assists the movement of the bladder across the conduit, so as to form a seal with said inner surface of said portion of said fluid conduit, and thereby prevent substantial fluid flow therethrough.

2. The inflatable bladder valve system as defined in claim 1, further comprising a fabric restraint surrounding an outer surface of said inflatable bladder.

3. The inflatable bladder valve system as defined in claim 1, further comprising an expandable membrane on said inflatable bladder for sealably compressing against said fluid conduit.

4. The inflatable bladder valve system as defined in claim 3, wherein said expandable membrane is a torus seal made of an inflatable thin flexible elastomeric material.

5. The inflatable bladder valve system as defined in claim 1, wherein said barrier is a portion of said inflatable bladder.

6. The inflatable bladder valve system as defined in claim 5, wherein said barrier is secured adjacent an aperture in a wall of said fluid conduit.

7. The inflatable bladder valve system as defined in claim 6, wherein said barrier is a plug.

8. The inflatable bladder valve system as defined in claim 1, wherein said fluid source is a gas.

9. The inflatable bladder valve system as defined in claim 8, wherein said gas is provided by a low pressure gas actuating device.

10. The inflatable bladder valve system as defined in claim 1, further comprising means for retaining said inflatable bladder in a selected area within said fluid conduit.

11. The inflatable bladder valve system as defined in claim 10, wherein said retaining means is an enlarged chamber in said fluid conduit.

12. The inflatable bladder valve system as defined in claim 11, wherein said enlarged chamber is spherical.

13. A method of using an inflatable bladder valve system, comprising the steps of:
providing a fluid flow duct;
providing an inflatable bladder with a fabric restraint;
storing said inflatable bladder in a deflated state in a separate compartment of said valve system outside said fluid flow duct;
providing a barrier disposed below and affixed to a portion of said inflatable bladder for retaining said deflated bladder in said separate compartment, said barrier positioned between said inflatable bladder and said fluid flow duct so as to prevent said deflated bladder from extending into said fluid flow duct;
inflating said deflated inflatable bladder, wherein upon inflation said bladder expands within a portion of said fluid flow duct, and said barrier assists the movement of the bladder across the fluid flow duct, so as to form a seal with an inner surface of said portion of said fluid flow duct, and thereby prevent substantial fluid flow therethrough; and
deflating said bladder by osmosis of a gas through said inflatable bladder over time.

14. An inflatable bladder valve system, comprising:
a fluid flow duct;
an inflatable bladder with a fabric restraint;
means for storing said inflatable bladder in a deflated configuration in a separate compartment of said valve system outside said duct;
a barrier disposed below and affixed to said inflatable bladder for retaining said deflated bladder in said separate compartment, said barrier positioned between said inflatable bladder and said fluid flow duct so as to prevent said deflated bladder from extending into said fluid flow duct;
means for inflating said inflatable bladder, wherein upon inflation said barrier assists the movement of the bladder across the conduit so that the bladder forms a seal with an inner surface of said duct, and thereby prevents substantial fluid flow therethrough; and
means for deflating said bladder.

15. The inflatable bladder valve system as defined in claim 14, wherein said inflating means comprises a low pressure gas actuating device.

16. The inflatable bladder valve system as defined in claim 14, wherein said deflating means comprises gas permeable portions of said bladder permitting osmosis of gas through said inflatable bladder over time.

17. An inflatable bladder valve system, comprising:
a piping duct having an inner surface providing for fluid flow therethrough;
an inflatable bladder stowed in a deflated state in a separate compartment of said valve system outside a fluid flow path of said piping duct;
a plug positioned as a barrier between said inflatable barrier and said fluid flow path, said barrier disposed below and affixed to a portion of said inflatable bladder for retaining said deflated bladder in said separate compartment and preventing any portion of said deflated bladder from extending into said fluid flow path; and
a gas in fluid communication with said bladder for transmitting fluid into said bladder so as to inflate said bladder, wherein upon inflation said bladder expands within a portion of said piping duct, and said barrier assists the movement of the bladder across the conduit, so as to form a seal with said inner surface of said piping duct, and thereby prevent substantial fluid flow therethrough.

18. The inflatable bladder valve system as defined in claim 17, further comprising a fabric restraint surrounding an outer surface of said inflatable bladder.

19. The inflatable bladder valve system as defined in claim 17, further comprising an expandable membrane on said inflatable bladder for sealably compressing against said piping duct.

20. The inflatable bladder valve system as defined in claim 19, wherein said expandable membrane is a torus seal made of an inflatable thin flexible elastomeric material.

21. The inflatable bladder valve system as defined in claim 17, wherein said plug is secured adjacent an aperture in a wall of said piping duct.

22. The inflatable bladder valve system as defined in claim 21, wherein said plug is removably secured to said wall with a radial static O-ring in a groove surrounding said plug.

23. The inflatable bladder valve system as defined in claim 17, wherein said gas is provided by a low pressure gas actuating device.

24. The inflatable bladder valve system as defined in claim 17, further comprising an enlarged spherical chamber for retaining said inflatable bladder in a selected area within said piping duct.

* * * * *